United States Patent
Martin, Jr.

(10) Patent No.: US 7,720,805 B1
(45) Date of Patent: May 18, 2010

(54) SEQUENTIAL UNLOAD PROCESSING OF IMS DATABASES

(75) Inventor: James L. Martin, Jr., Round Rock, TX (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 09/413,105

(22) Filed: Oct. 6, 1999

(51) Int. Cl.
*G06F 17/00* (2006.01)

(52) U.S. Cl. ........................... 707/602; 707/693

(58) Field of Classification Search ............. 707/1, 707/101, 2, 200, 205, 206, 100
See application file for complete search history.

(56) References Cited

U.S. PATENT DOCUMENTS

| | | | |
|---|---|---|---|
| 5,761,667 A | 6/1998 | Koeppen | 707/101 |
| 5,881,379 A | 3/1999 | Beier et al. | 707/101 |
| 5,933,820 A | 8/1999 | Beier et al. | 707/1 |
| 6,070,170 A * | 5/2000 | Friske et al. | 707/202 |
| 6,144,970 A * | 11/2000 | Bonner et al. | 707/206 |
| 6,295,541 B1 * | 9/2001 | Bodnar et al. | 707/203 |
| 6,397,311 B1 * | 5/2002 | Capps | 707/E17.01 |

* cited by examiner

*Primary Examiner*—Vincent Boccio
(74) *Attorney, Agent, or Firm*—Wong, Cabello, Lutsch, Rutherford & Brucculeri LLP

(57) ABSTRACT

A method and system for unloading an IMS database. Segments in the segment array are stored in an indexed order or are stored in a relative byte address (RBA) order. In both cases, either an image copy of an IMS database or an actual IMS database processed sequentially may be utilized. For indexed order storage, a lookup table may be created to include a key value and a segment array location. A segment array may be created to store both the root and child segments from the IMS database. For RBA ordered storage, a first segment array may be created to store the root segments from the IMS database in a sequential order. Additionally, a second segment array may be created to store the child segments from the IMS database in a relative byte address (RBA) order.

42 Claims, 10 Drawing Sheets

SEQUENTIAL UNLOAD PROCESSING OF IMS DATABASES

BACKGROUND OF THE INVENTION

1. Field of the Invention

The present invention relates to computer software, and more particularly to IMS databases.

2. Description of the Related Art

The current technique of unloading an IMS database is to retrieve the individual database segments in hierarchical order using physical pointers stored within each segment prefix. Retrieving an IMS database in hierarchical order normally results in reading the database blocks in random order, and often reading the same block multiple times during the unload process. Additionally, the I/O operations used during a standard unload of an IMS database are often unanticipated and are generally the lowest performing type of I/O operation.

FIG. 2 illustrates the hierarchical order of segments in an IMS database. As shown, segments 1 and 3 are root segments, and all of the remaining segments are child segments. Retrieving the database record beginning with root segment 1 requires 3 blocks to be read, as follows: read block 1 to obtain segments 1 and 2, read block 6 to obtain segment 52, read block 4 to obtain segment 31. Similarly, retrieving the database record beginning with root segment 3 also requires 3 blocks to be read, as follows: read block 1 to obtain segment 3, read block 4 to obtain segment 32, read block 7 to obtain segment 63.

Therefore, retrieving an IMS database record requires a number of different block reads, resulting in slow access times and long latencies. For at least the foregoing reasons, there is a need for an improved system and method for unload processing of IMS databases in a more efficient manner.

SUMMARY OF THE INVENTION

The present invention provides various embodiments of an improved method and system for unloading an IMS database. The method involves accessing the IMS database, de-blocking segments from blocks of the IMS database, and storing the segments in a segment array. In a first embodiment, segments in the segment array are stored in an indexed order. In a second embodiment, segments in the segment array are stored in a relative byte address (RBA) order. In both the first embodiment and the second embodiment, either an image copy of an IMS database or an actual IMS database processed sequentially may be utilized.

In the first embodiment, a lookup table may be created to include a key value and a segment array location. The key value may be used to index into the lookup table to obtain a corresponding segment array location. The segment array may be created to store both the root and child segments from either the image copy of the IMS database or the actual IMS database. These segments may be stored in an indexed order according to a collating sequence of the key values in the lookup table wherein the key value may include a segment type identification number. Additionally, the key value may also include a partition identification number, a data set group identification number, and a relative byte address.

In the second embodiment, a first segment array may be created to store the root segments from the image copy of the IMS database or the actual IMS database in a sequential order. Additionally, a second segment array may be created to store the child segments from the image copy of the IMS database or the actual IMS database in a relative byte address (RBA) order.

BRIEF DESCRIPTION OF THE DRAWINGS

A better understanding of the present invention can be obtained when the following detailed description of various embodiments is considered in conjunction with the following drawings, in which.

Figure 1:
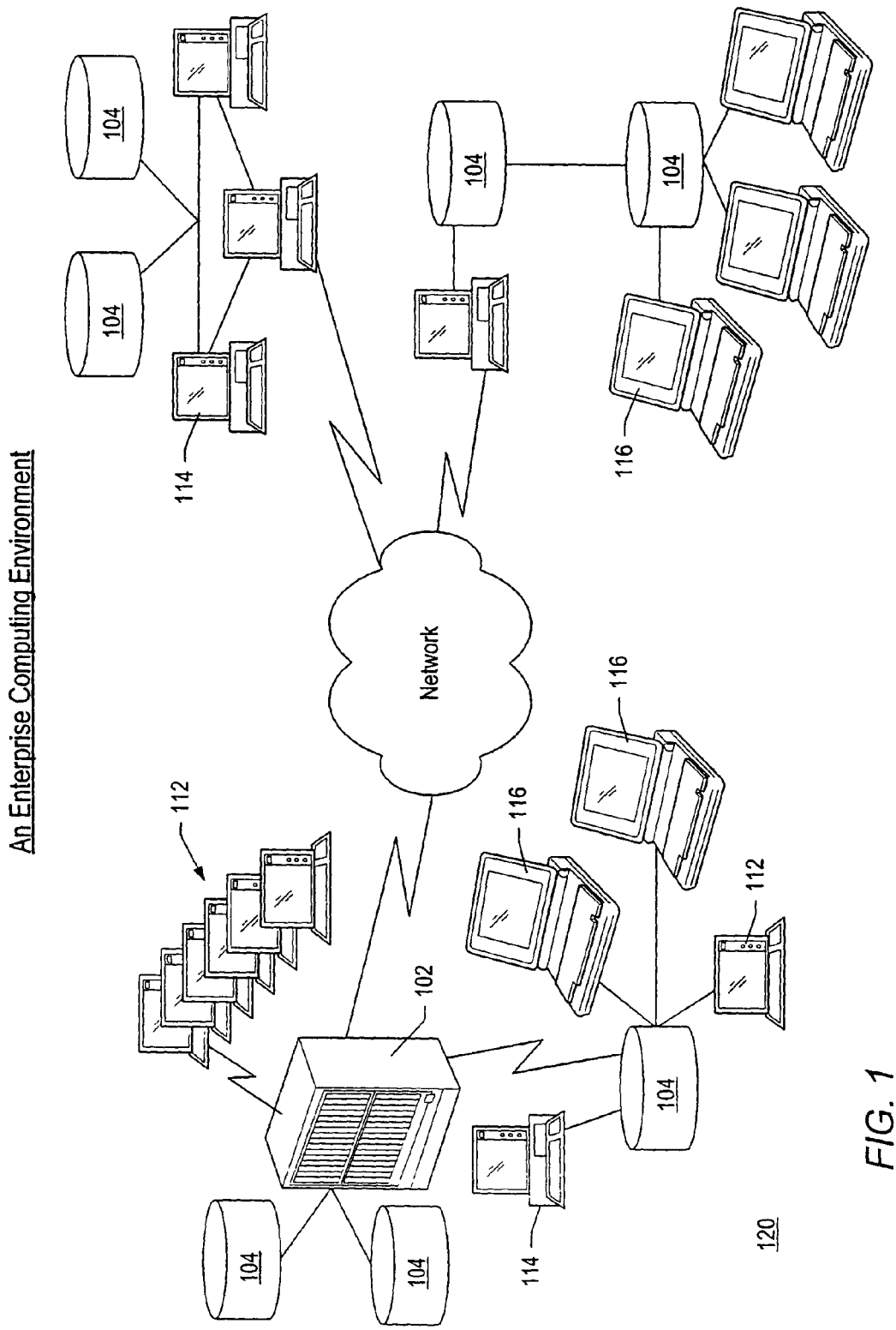
FIG. 1 illustrates an enterprise computing environment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

FIG. 1: An Enterprise Computing Environment

FIG. 1 illustrates an enterprise computing environment according to one embodiment of the present invention. As shown, the enterprise computing environment may include one or more mainframe computers 102 which each include one or more storage devices 104, also referred to as direct access storage devices (DASD). A plurality of computer systems or terminals 112 may be coupled to the mainframe computer 102, wherein the computer systems or terminals 112 access data stored in the storage devices 104 coupled to or comprised in the mainframe computer 102.

The mainframe computer system 102 may be coupled to one or more other computer systems and/or computer networks. The mainframe computer system 102 may be coupled locally to a computer system network 120 in a local area network (LAN) configuration, or may be coupled to one or more computer systems and/or networks through a wide area network (WAN). As shown in FIG. 1, the mainframe computer system 102 may be directly coupled to a local area network 120, such as a PC-based or client/server based network. The LAN 120 may comprise a storage device or file server 104 coupled to one or more desktop computer systems 114, one or more portable computer systems 116 and possibly one or more computer systems or terminals 112. As also shown in FIG. 1, the mainframe computer 102 is also coupled through a wide area network, represented by the "cloud" in FIG. 1, to one or more additional local area networks, such as PC-based networks as shown. Each of the PC based networks may comprise one or more storage devices or file servers 104 and one or more of either desktop computer systems 114 or portable computer systems 116. The wide area network may be any of various types, such as the Internet.

Each of the one or more mainframe computer systems 102, the computer systems 114 and 116, as well as file servers 104 may include various components as is standard in computer systems. For example, the mainframe computer system 102 may include one or more processors or CPUs, preferably multiple CPUs, as well as non-volatile memory, such as represented by elements 104, and various internal buses etc. as is well known in the art. In a similar manner, each of the desktop computer systems 114 and/or portable computer systems 116, or other computer systems comprised in the enterprise, comprise various standard computer components including one or more CPUs, one or more buses, memory, a power supply and non-volatile memory. The computer systems or terminals 112 may comprise standard "dumb" terminals as used with mainframes, i.e., may comprise a display and video hardware and/or memory for displaying data on the display provided from the mainframe computer system 102.

The mainframe computer system 102 may store a database comprising data which is desired to be accessible among a portion or all of the enterprise, i.e., is desired to be accessible by one or more of the computer systems 114 and 116. In the present application, the term "database" includes both databases and data sets, such as an IMS data set, among others. In one embodiment, the database stored in the mainframe computer system 102 is desired to be distributed among one or more of the various file servers 104 connected to the various computer systems 114 and 116. Thus, it is desired that the data comprising the database be distributed among the enterprise for ready access among multiple users. It is also possible that multiple different database management systems are used within the enterprise, i.e., one or more of the file systems 104 may store its own database which is desired to be replicated among various of the other file servers and/or the mainframe computer system 102.

The present invention preferably comprises sequential unload processing software programs stored in the mainframe computer system 102 and/or one or more of the computer systems 114, 116 or 104 which operate to provide various services. The sequential unload processing software programs are preferably comprised on the mainframe computer system 102. However, it is noted that portions of the sequential unload processing software programs may be distributed throughout computers in the enterprise. Also, the sequential unload processing software programs preferably interface to one or more various OEM utilities.

The computer systems 104, 112, 114, and 116 preferably include a memory medium on which computer programs according to various embodiments may be stored. The term "memory medium" is intended to include an installation medium, e.g., a CD-ROM, or floppy disks, a computer system memory such as DRAM, SRAM, EDO RAM, Rambus RAM, etc., or a non-volatile memory such as a magnetic media, e.g., a hard drive, "DASD", or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, the computer systems 104, 112, 114, and 116 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium preferably stores a software program or programs for sequential unload processing of IMS databases as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A computer system executing code and data from the memory medium comprises a means for creating and executing the software program or programs according to the methods and/or block diagrams described below.

In the preferred embodiment, the present invention comprises one or more software components, preferably a plurality of software components, which operate to provide various sequential unload processing of database records of IMS databases.

The present invention further comprises a system and method to access and unload an IMS database. The system and method to access and unload an IMS database is designed for ease of use and high-performance, and features an extensible architecture. To enhance performance, the system and method of the present invention are designed to minimize I/O and CPU overhead, and limit maintenance downtime. Since the segments of the IMS database are unloaded and stored in a segment array, the resulting process of accessing database records from the segment array generates far less I/O overhead and is significantly more efficient than multiple accesses of the same block directly from the IMS database.

The system and method of the present invention also makes opportunistic use of database maintenance time. According to the present invention, a DBA (Data Base Administrator) is able to take advantage of the minimal windows available for operational database functions to perform reorganizations, copies, moves, data extractions, transformations and loads. DBAs are thus able to perform a variety of maintenance and data management functions at the same time for improved efficiency.

Figure 2:
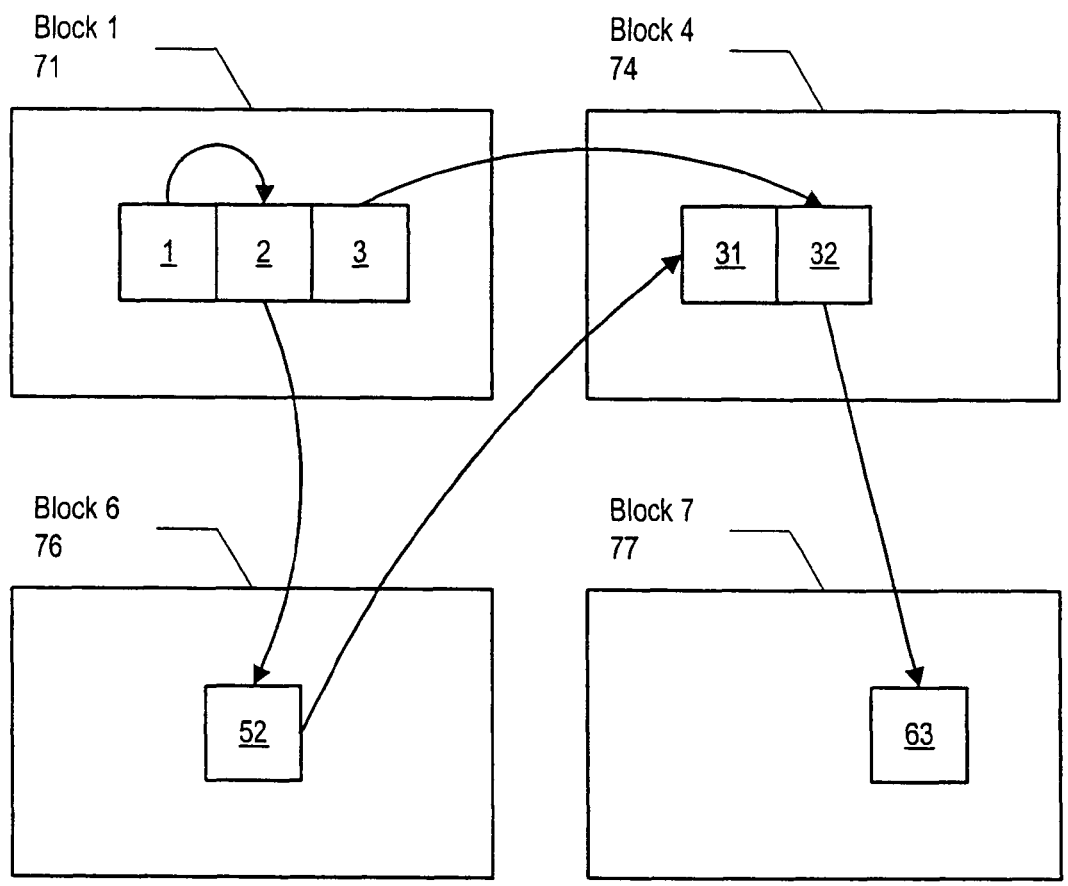
FIG. 2 illustrates an example of the current technique of unloading a database record from an IMS database.

FIG. 2: Current Technique of Unloading a Database Record from an IMS Database

FIG. 2 illustrates an exemplary portion of an IMS database. As shown, this portion includes four blocks labeled "Block 1", "Block 4", "Block 6", and "Block 7". Block 1 contains segments 1, 2, and 3; Block 4 contains segments 31 and 32; Block 6 contains segment 52; and Block 7 contains segment 63. Segments 1 and 3 are root segments, and all of the other segments are child segments. In general, as new child segments are added to an IMS database hierarchy, the segments may be added to blocks depending on space availability. As a result, related segments may be stored in different blocks, possibly non-contiguous blocks. This results in a fragmented database, as shown in FIG. 2. As a result, access of a database record may require reading a number of non-contiguous blocks, which results in lengthier access times. For example, retrieving the database record beginning with root segment 1 requires 3 blocks to be read, as follows: read block 1 to obtain segments 1 and 2; read block 6 to obtain segment 52; read block 4 to obtain segment 31. Similarly, retrieving the database record beginning with root segment 3 also requires 3 blocks to be read, as follows: read block 1 to obtain segment 3; read block 4 to obtain segment 32; read block 7 to obtain segment 63.

Figure 3:
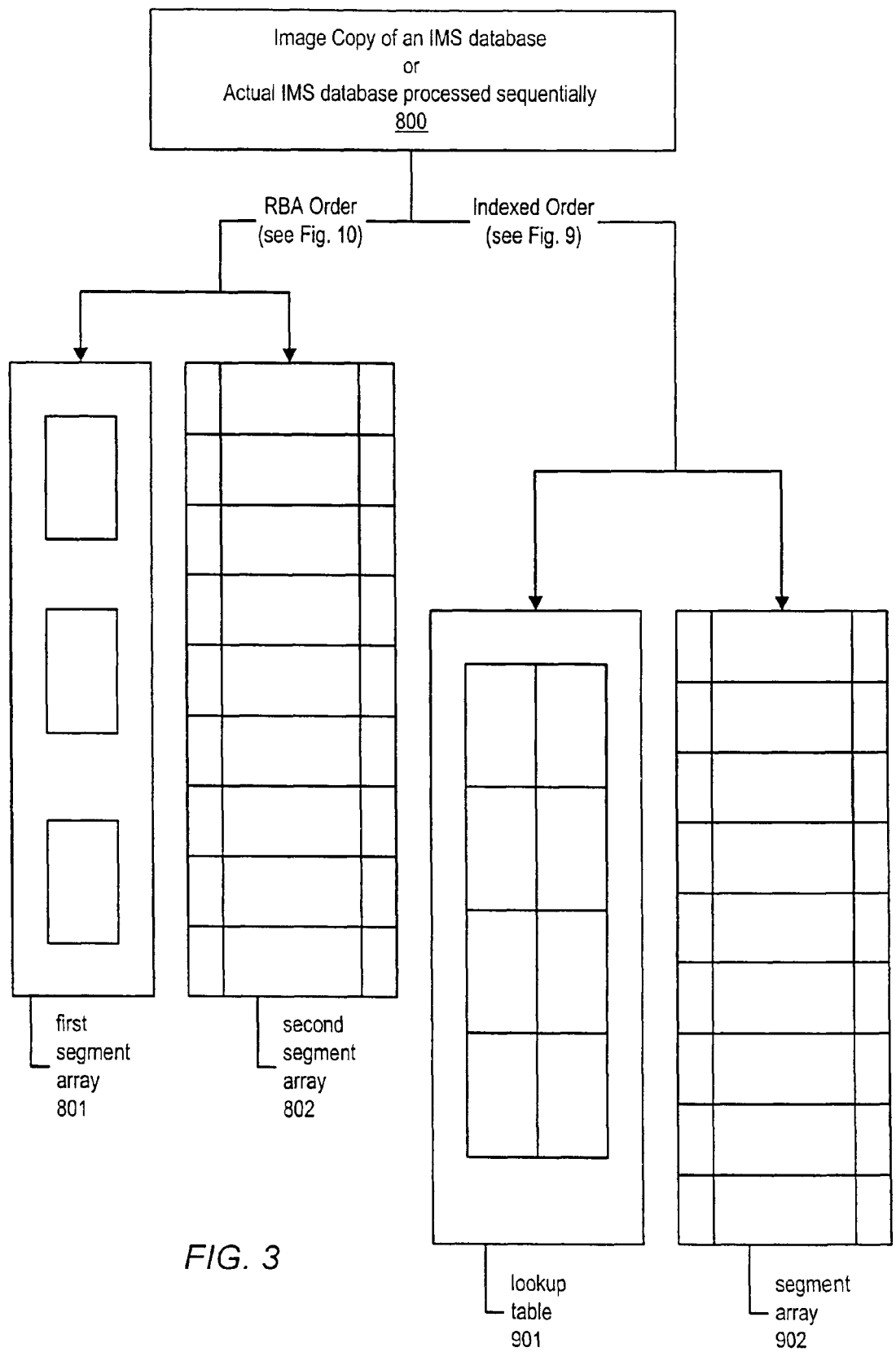
FIG. 3 is a block diagram illustrating the storing of segments in an indexed or a relative byte address (RBA) order according to one embodiment.

FIG. 3: Storing Segments in an Indexed or a Relative Byte Address (RBA) Order

Figure 4:
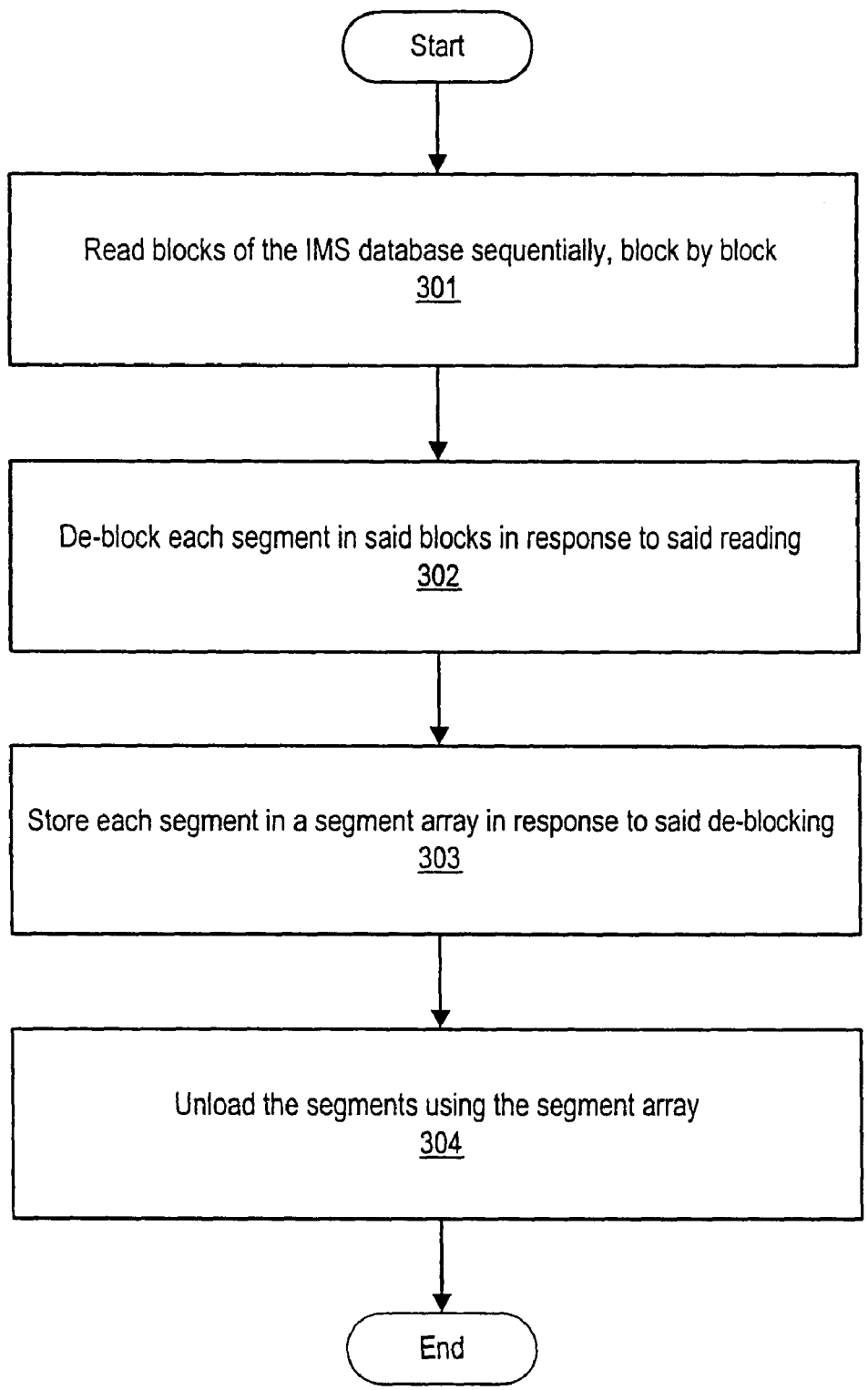
FIG. 4 is a flowchart illustrating an overview of sequential unload processing of an IMS database according to one embodiment.

FIG. 3 illustrates two embodiments of accessing an IMS database 800 and storing the segments in the segment array, as performed in step 303 in FIG. 4. A first embodiment is storing the segments in an indexed order which is shown on the right hand side of FIG. 3. A second embodiment is storing the segments in a relative byte address (RBA) order which is shown on the left hand side of FIG. 3.

In both the first embodiment and the second embodiment, an IMS database 800 (either an image copy of an IMS database or an actual IMS database processed sequentially) may be utilized. The IMS database 800 is made up of root and child segments.

Figure 9:
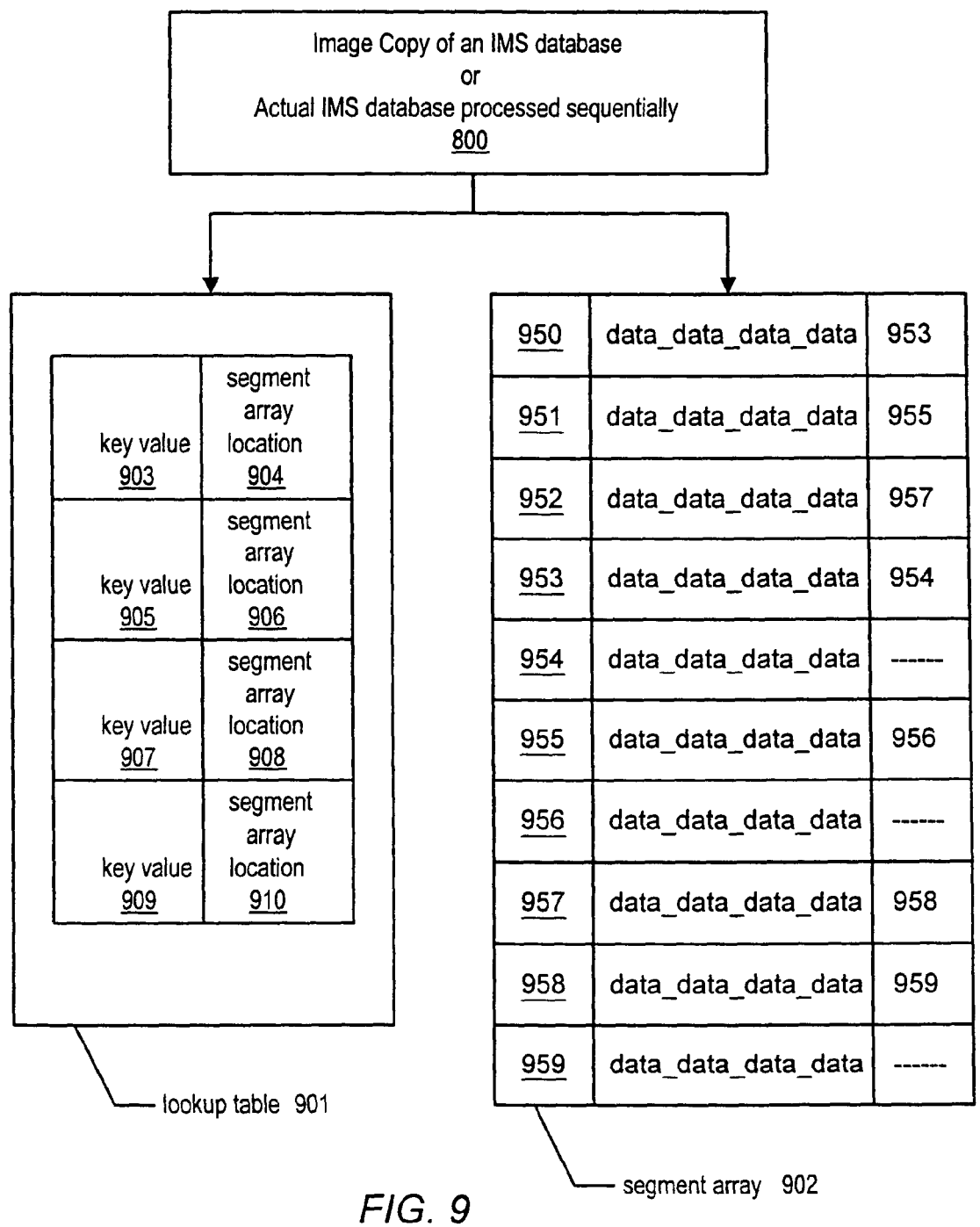
FIG. 9 is a block diagram illustrating the storing of segments in an indexed order according to one embodiment.

In the first embodiment, described in more detail in FIG. 9, a lookup table 901 may be created to include a key value and a segment array location. The key value may be used to index into the lookup table 901 to obtain a corresponding segment array location. A segment array 902 may be created to store both the root and child segments from the IMS database 800. These segments may be stored in an indexed order according to a collating sequence of the key values in the lookup table 901, wherein the key value may include a segment type identification number. Additionally, the key value may also include a partition identification number, a data set group identification number, and a relative byte address, as described in FIG. 5*a*.

Figure 10:
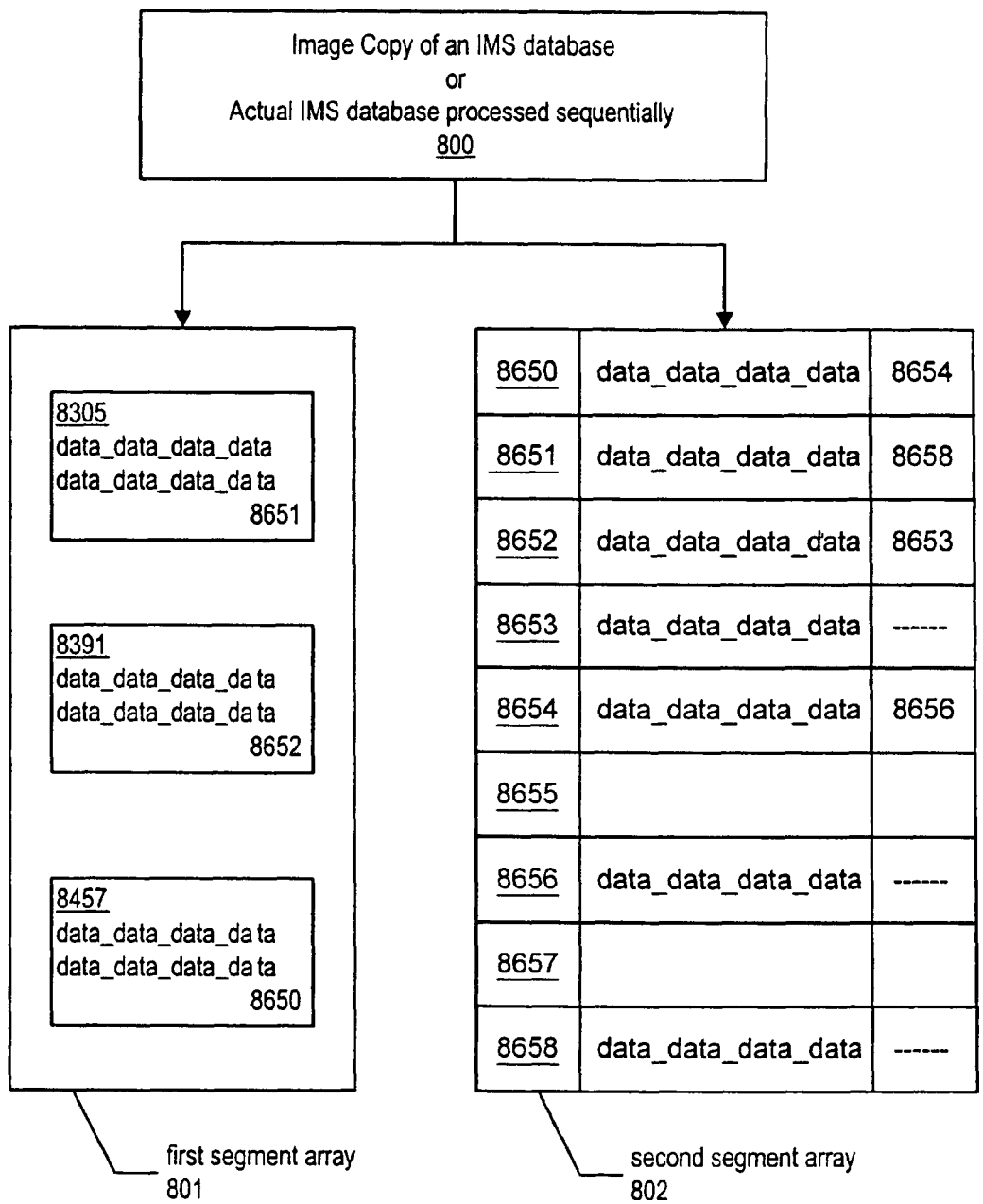
FIG. 10 is a block diagram illustrating the storing of segments in a relative byte address (RBA) order according to one embodiment.

In the second embodiment, described in more detail in FIG. 10, a first segment array 801 may be created to store the root segments from the IMS database 800 in a sequential order. It is not necessary to store the root segments in relative byte address (RBA) order because root segments are accessed in sequential order. A benefit of storing the root segments in sequential order is that no place-holder entries for RBAs not used (e.g., gaps) will exist in the first segment array. Additionally, a second segment array 802 may be created to store the child segments from the IMS database 800 in a relative byte address (RBA) order.

FIG. 4: Sequential Unload Processing of an IMS Database

FIG. 4 is a flowchart of an embodiment of a system and method for sequential unload processing of an IMS database.

In step 301 blocks of the IMS database may be read sequentially, block by block, wherein each of the blocks may include zero or more segments. All blocks are preferably read, including blocks that have zero segments, because it is not until the block is actually read that it can be determined how many segments are contained in the block. The blocks may be read either from an image copy of an IMS database or from an actual IMS database processed sequentially.

In step 302 the segments in the blocks may be de-blocked in response to the read performed in step 301. The de-blocking may include extracting the individual IMS segments that are physically contained within the physical block.

In step 303 each segment is stored in a segment array in response to the de-blocking. Depending on the embodiment in which the segments are stored (e.g., indexed (see FIGS. 5*a*, 5*b*, and 6) or relative byte address (see FIGS. 7*a*, 7*b*, and 8)), the segments may be placed in: a segment array reserved for root segments, a segment array reserved for child segments, or a segment array reserved for all segments (both root and child).

In step 304 the segments in the segment array may be directly accessible and the segment array may be usable to unload the segments. Thus the flowchart of FIG. 4 operates to create a segment array which may allow faster access to database records than traditional methods.

Figure 5A:
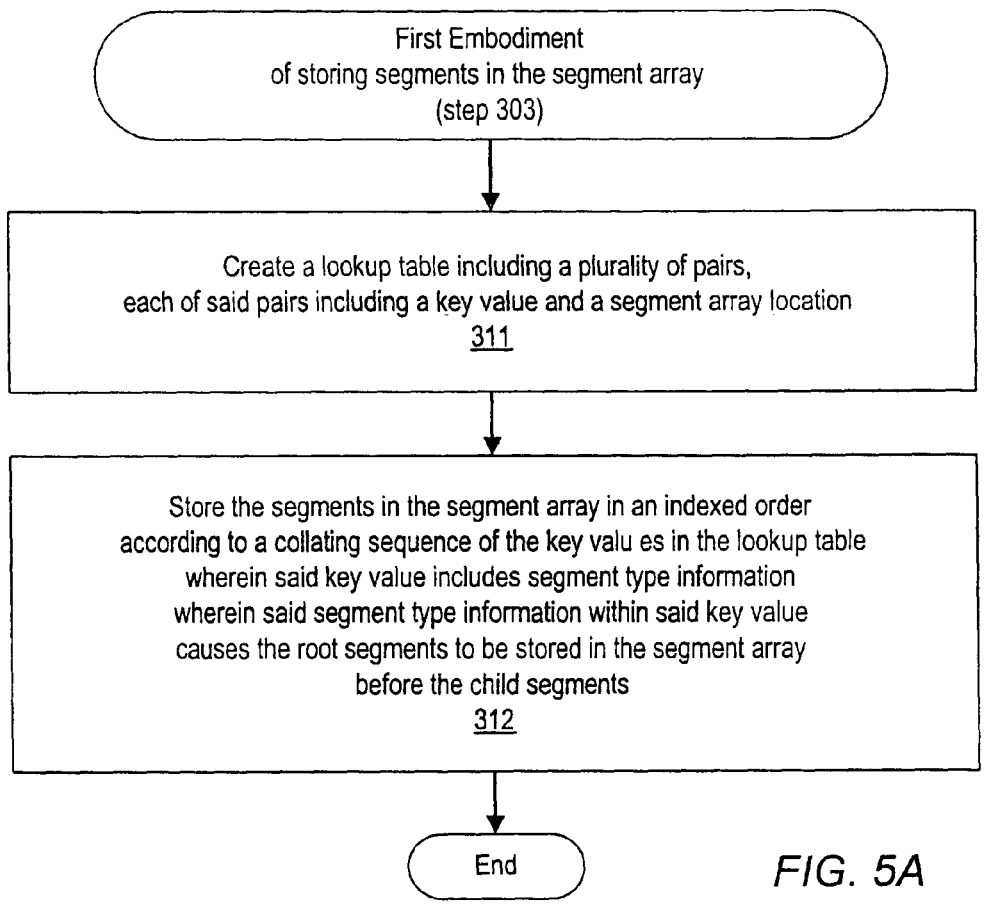
FIG. 5a is a flowchart illustrating the storing of segments in an indexed order according to one embodiment.

FIG. 5a: Storing Segments in an Indexed Order

FIG. 5*a* is a flowchart illustrating a first embodiment of storing the segments in the segment array, as performed in step 303 in FIG. 4.

In step 311 a lookup table may be created. The lookup table may include a plurality of pairs, wherein each of the pairs may include a key value and a segment array location. The key value may be used to index into the lookup table to obtain a corresponding segment array location.

In step 312 the segments in the segment array may be stored in an indexed order according to a collating sequence of the key values in the lookup table, wherein the key value may include a segment type identification number. Additionally, the key value may also include a partition identification number, a data set group identification number, and a relative byte address. The segment type identification number within the key value may cause the root segments to be stored in the segment array before the child segments. For example, if root segment types are designated as segment type identification number 00 and child segment types are designated as segment type identification number 01, and the segment type identification number is the left-most portion of the key value, and the collating sequence is ascending numerical order, then all of the root segments would precede all of the child segments.

The key value is preferably organized as follows: segment type identification number, partition identification number, data set group identification number, relative byte address.

Figure 5B:
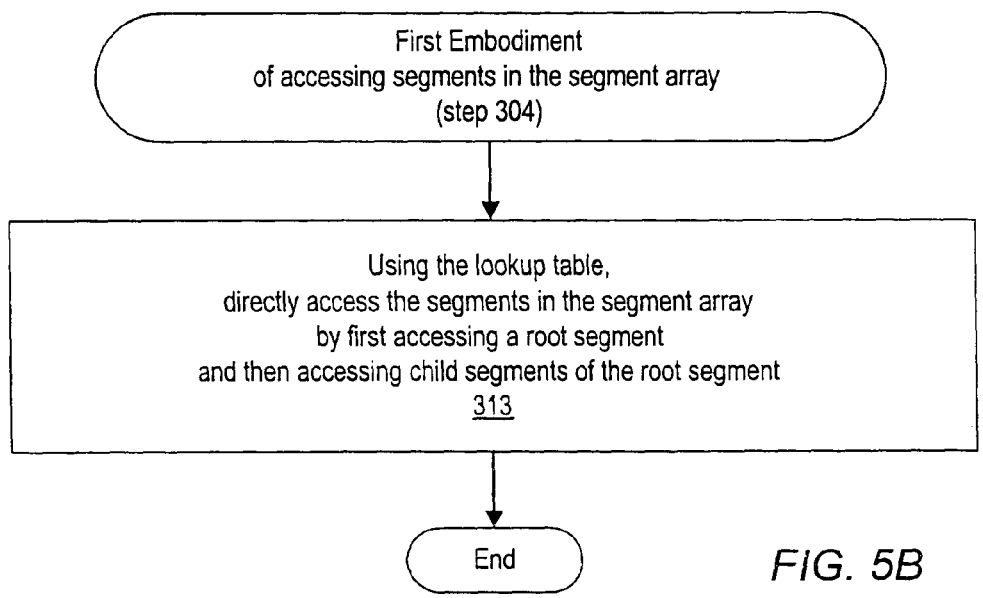
FIG. 5b is a flowchart illustrating the accessing of segments that are stored in an indexed order according to one embodiment.

FIG. 5b: Accessing Segments that are Stored in an Indexed Order

FIG. 5*b* is a flowchart illustrating a first embodiment of accessing the segments in the segment array, as performed in step 304 in FIG. 4.

In step 313 the lookup table may be used to directly access the segments in the segment array by first accessing a root segment and then accessing child segments of the root segment.

Figure 6:
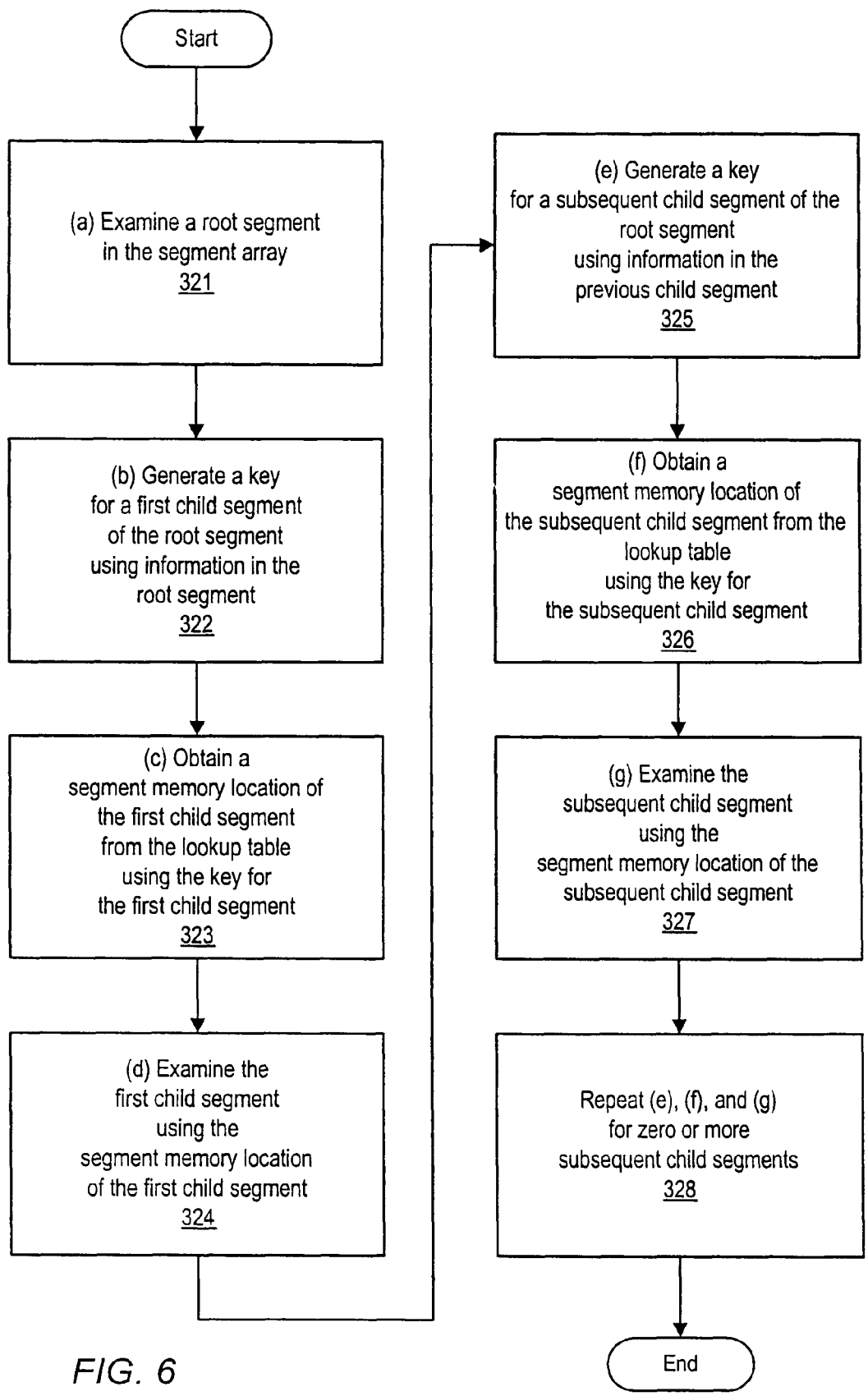
FIG. 6 is a flowchart further illustrating the accessing of segments that are stored in an indexed order according to one embodiment.

FIG. 6: Details of Accessing Segments that are Stored in an Indexed Order

FIG. 6 is a flowchart illustrating a first embodiment of accessing the segments in the segment array, as performed in step 313 in FIG. 5*b*. The stored segments are stored according to the flowchart of FIG. 5*a*.

In step 321 a root segment in the segment array may be examined.

In step 322 a key for a first child segment of the root segment may be generated using information in the root segment. For example, if child segment types are designated as 01 (as noted in FIG. 5*a*), and the root segment contains the following information about the first child segment: its partition identification number is 48, its data set group identification number is 07, and its relative byte address is 2540, then the key may be: 0148072540.

In step 323 a segment memory location of the first child segment may be obtained from the lookup table using the key for the first child segment. Continuing the example from step 322, the segment memory location 93257164 may correspond to the key value 0148072540.

In step 324 the first child segment may be examined using the segment memory location of the first child segment.

In step 325 a key for a subsequent child segment of the root segment may be generated using information in the previous child segment. For example, if child segment types are designated as 01 (as noted in FIG. 5*a*), and the first child segment contains the following information about the second child segment: its partition identification number is 48, its data set group identification number is 07, and its relative byte address is 2680, then the key may be: 0148072680.

In step 326 a segment memory location of the subsequent child segment may be obtained from the lookup table using the key for the subsequent child segment. Continuing the example from step 325, the segment memory location 92571643 may correspond to the key value 0148072680.

In step 327 the subsequent child segment may be examined using the segment memory location of the subsequent child segment.

In step 328 (*e*), (*f*), and (*g*) may be repeated for zero or more subsequent child segments.

Figure 7A:
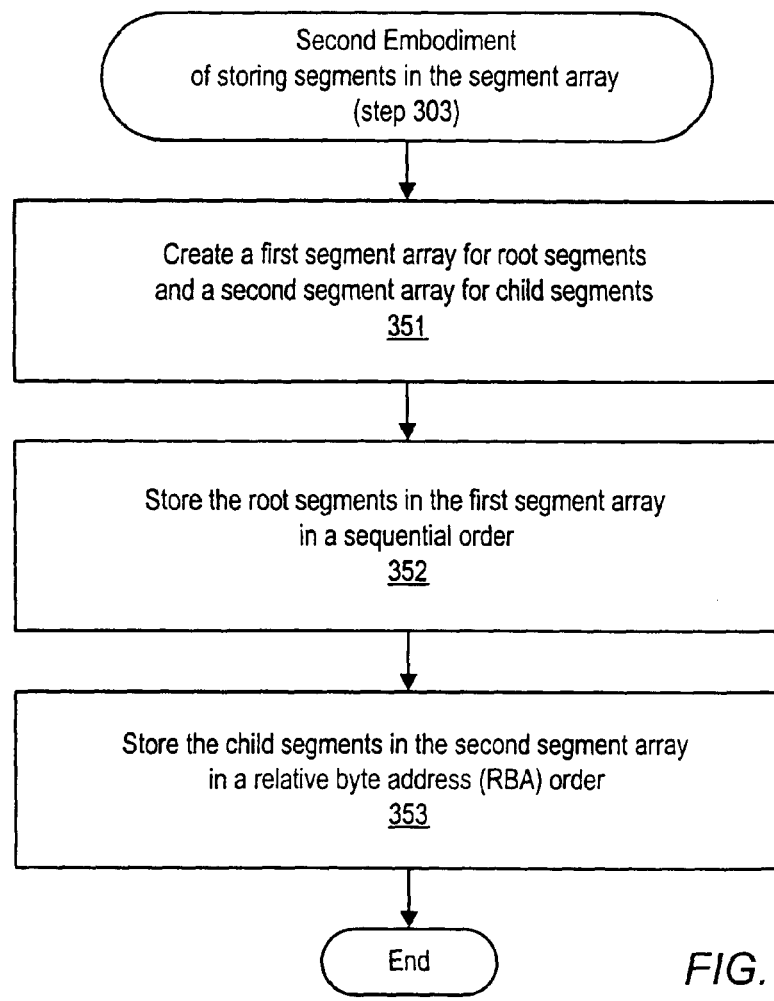
FIG. 7a is a flowchart illustrating the storing of segments in a relative byte address (RBA) order according to one embodiment.

FIG. 7*a*: Storing Segments in a Relative Byte Address (RBA) Order

FIG. 7*a* is a flowchart illustrating a second embodiment of storing the segments in the segment array, as performed in step 303 in FIG. 4.

In step 351 a first segment array for root segments and a second segment array for child segments may be created. Since each database record begins with a root segment, it is useful to separate the root segments from the child segments, in order to increase performance in accessing database records. The second segment array contains sequential relative byte addresses. It is noted that some individual addresses in the RBA segment array may be empty, that is, not a child segment of any database record. It is necessary to include every sequential relative byte address so that correct data may be retrieved using relative byte addresses as an index into the array. For example, if the second segment array begins with relative byte address 0 and the segments are of a fixed length of 20 bytes, then the next nine entries in the second segment array must be 20, 40, 60, 80, 100, 120, 140, 160 and 180. If relative byte address 0 is the first child segment for a first database record, and the subsequent child segments for the first database record are 60 and 120, and if relative byte address 20 is the first child segment for a second database record, and the subsequent child segments for the second database record are 80 and 140, and if relative byte addresses 40 and 100 are empty, the correct values would not be obtained if the empty relative byte addresses 40 and 100 were not used as place-holders.

For purposes of illustration, let the single character 'a' represent relative byte address 0. Similarly, let the single character 'b' represent relative byte address 20, and so on: let 'c' represent 40, let 'd' represent 60, let 'e' represent 80, let 'f' represent 100, let 'g' represent 120, let 'h' represent 140, let 'i' represent 160, let 'j' represent 180. Consider the single character representation of each relative byte address (RBA):

abcdefghij: where all RBAs maintain a place abdeghij: where only those RBAs that have a value maintain a place When reading by offset position, removing positions causes all addresses occurring after the first removed position to be off by one address. Similarly, all addresses occurring after the second removed position are off by two addresses.

Reading the child segments for the first database record, would yield: "adg" in the case where all RBAs maintain a place, and "aei" in the case where only those RBAs that have a value maintain a place. Notice that the first database record's second child segment's address is off by one address ('e' rather than 'd') and the first database record's third child segment's address is off by two addresses rather than 'g').

Reading the child segments for the second database record, would yield: "beh" in the case where all RBAs maintain a place, and "bgj" in the case where only those RBAs that have a value maintain a place. Notice that the second database record's second child segment's address is off by two addresses ('g' rather than 'e') and the second database record's third child segment's address is off by two addresses ('j' rather than 'h').

In step 352 the root segments may be stored in the first segment array in a sequential order.

In step 353 the child segments may be stored in the second segment array in a relative byte address (RBA) order. Thus, child segments are stored in the second segment array based on their relative byte address.

Figure 7B:
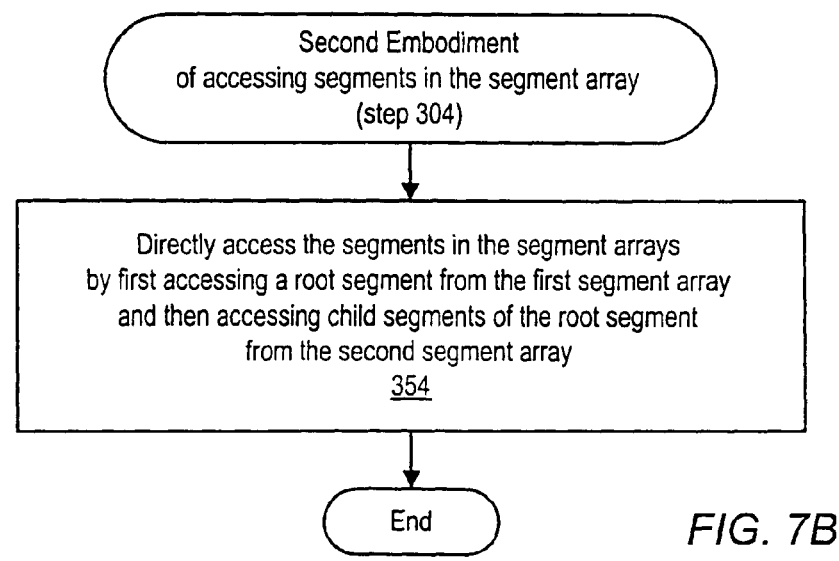
FIG. 7b is a flowchart illustrating the accessing of segments that are stored in a relative byte address (RBA) order according to one embodiment.

FIG. 7*b*: Accessing Segments that are Stored in a Relative Byte Address (RBA) Order FIG. 7*b* is a flowchart illustrating a second embodiment of accessing the segments in the segment array, as performed in step 304 in FIG. 4.

In step 354 the segments in the segment arrays may be directly accessible by first accessing a root segment from the first segment array and then accessing child segments of the root segment from the second segment array.

Figure 8:
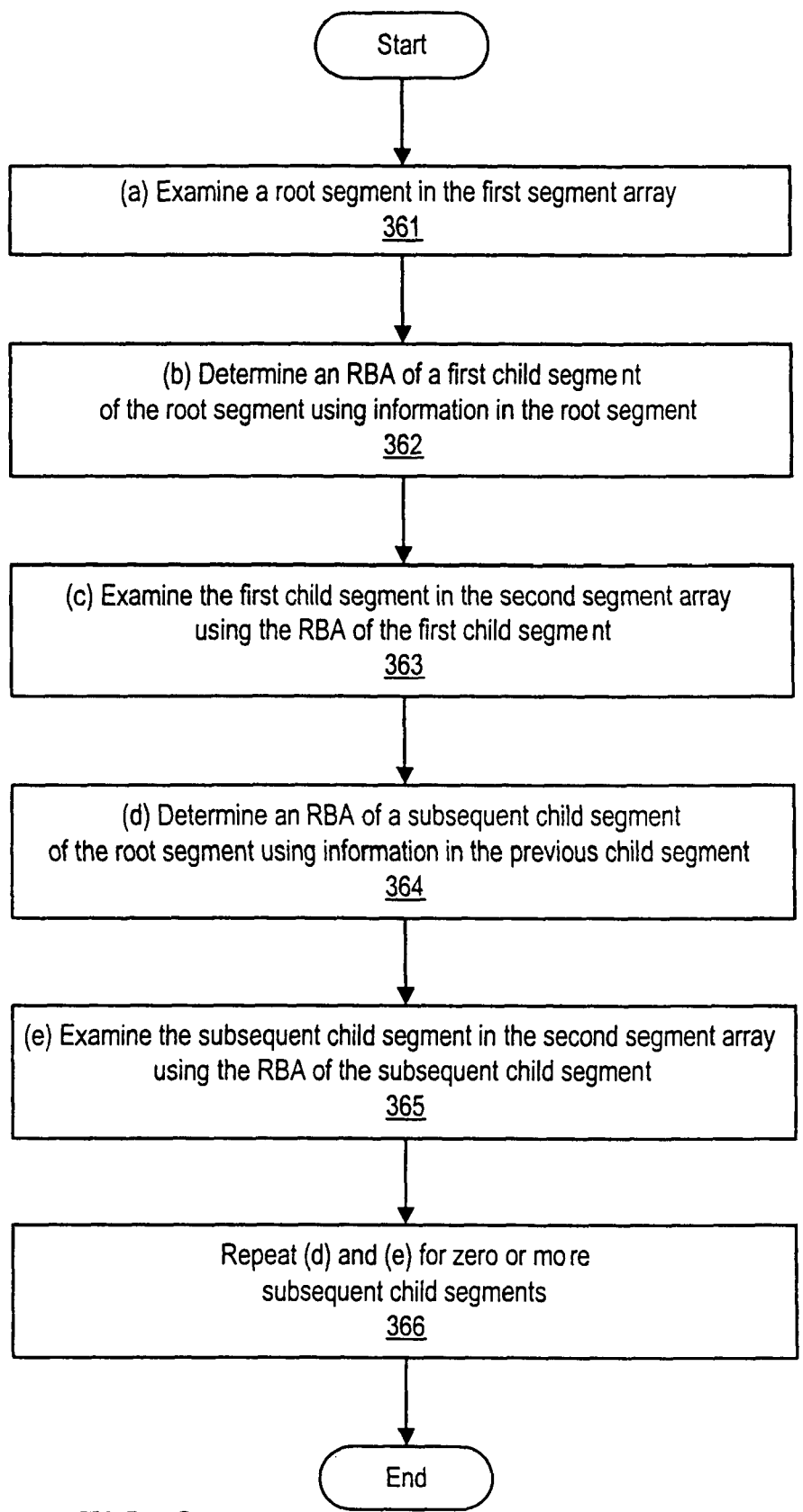
FIG. 8 is a flowchart further illustrating the accessing of segments that are stored in a relative byte address (RBA) order according to one embodiment.

FIG. 8: Accessing Segments that are Stored in a Relative Byte Address (RBA) Order FIG. 8 is a flowchart illustrating a second embodiment of accessing the segments in the segment array, as performed in step 354 in FIG. 7*b*. The stored segments are stored according to the flowchart of FIG. 7*a*.

In step 361 a root segment in the first segment array may be examined.

In step 362 an RBA of a first child segment of the root segment may be determined using information in the root segment.

In step 363 the first child segment in the second segment array may be examined using the RBA of the first child segment. For example, if the root segment contains the following information about the first child segment: its relative byte address is 2540, then the second segment array is accessed at that address.

In step 364 an RBA of a subsequent child segment of the root segment may be determined using information in the previous child segment. For example, if the previous child segment contains the following information about the subsequent child segment: its relative byte address is 3640, then the second segment array is accessed at that address.

In step 365 the subsequent child segment in the second segment array may be examined using the RBA of the subsequent child segment.

In step 366, (d) and (e) may be repeated for zero or more subsequent child segments.

FIG. 9: Storing Segments in an Indexed Order

FIG. 9 is a flowchart illustrating a first embodiment of storing the segments in the segment array, as performed in step 303 in FIG. 4.

An IMS database 800 (either an image copy of an IMS database or an actual IMS database processed sequentially) is made up of root and child segments. In one embodiment, a lookup table 901 may be created to include a key value and a segment array location. The key value may be used to index into the lookup table to obtain a corresponding segment array location.

A segment array 902 may be created to store both the root and child segments from the IMS database 800. These segments may be stored in an indexed order according to a collating sequence of the key values in the lookup table wherein the key value may include a segment type identification number. Additionally, the key value may also include a partition identification number, a data set group identification number, and a relative byte address, as described in FIG. 5a.

For example, key value 903 of lookup table 901 may contain 0048072620 and segment array location 904 of lookup table 901 may contain segment array address 950. Similar to the explanation in FIG. 6 for child segments, if root segment types are designated as 00 (as noted in FIG. 5a), and the root segment's partition identification number is 48, its data set group identification number is 07, and its relative byte address is 2620, then the key may be: 0048072620. The data for relative byte address 2620 is found at segment array address 950 in segment array 902, it contains data for the root segment, and the following information about the first child segment: its partition identification number is 48, its data set group identification number is 07, and its relative byte address is 2740. Then the key for the first child segment may be: 0148072740. Key value 909 of lookup table 901 may contain 0148072740 and segment array location 910 of lookup table 901 may contain segment array address 953. If child segment types are designated as 01 (as noted in FIG. 5a), and the child segment's partition identification number is 48, its data set group identification number is 07, and its relative byte address is 2740, then the key may be: 0148072740. The data for relative byte address 2740 is found at segment array address 953 in segment array 902, it contains data for the first child segment, and the following information about the second child segment: its partition identification number is 48, its data set group identification number is 07, and its relative byte address is 2800. Then the key for the second child segment may be: 0148072800. Similarly, the rest of the database records may be stored.

FIG. 10: Storing Segments in a Relative Byte Address (RBA) Order

FIG. 10 is a flowchart illustrating a second embodiment of storing the segments in the segment array, as performed in step 303 in FIG. 4.

An IMS database 800 (either an image copy of an IMS database or an actual IMS database processed sequentially) is made up of root and child segments. In one embodiment, a first segment array 801 may be created to store the root segments from the IMS database 800 in a sequential order. Additionally, a second segment array 802 may be created to store the child segments from the IMS database 800 in a relative byte address (RBA) order.

For example, a root segment with a relative byte address 8480 may be stored in first segment array 801, it may contain data for the root segment, and a relative byte address 8640 for a first child segment. The first child segment with a relative byte address 8640 may be stored in second segment array 802, it may contain data for the first child segment, and a relative byte address 8680 for a second child segment. The second child segment with a relative byte address 8680 may be stored in second segment array 802, it may contain data for the second child segment, and a relative byte address 8720 for a third child segment. The third child segment with a relative byte address 8720 may be stored in second segment array 802, it may contain data for the third child segment, and no additional relative byte addresses for subsequent child segments, indicating that the third child segment is the end of the database record. Similarly, the rest of the database records may be stored. Note that since the second segment array 802 may include consecutive relative byte addresses, there may be empty relative byte addresses containing no data and associated with no database record.

Various embodiments further include receiving or storing instructions and/or data implemented in accordance with the foregoing description upon a carrier medium. Suitable carrier media include storage media or memory media such as magnetic or optical media, e.g., disk or CD-ROM, as well as signals such as electrical, electromagnetic, or digital signals, conveyed via a communication medium such as networks 102 and/or 104 and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method for accessing an Information Management System (IMS) database, the method comprising:

reading blocks of the IMS database sequentially, block by block, wherein each of the blocks comprises zero or more segments;

de-blocking segments in said blocks in response to said reading;

storing each segment in a segment array in response to said de-blocking, segments in the segment array being directly accessible, the segment array being usable to unload the segments; and creating a lookup table, said lookup table being useable to access the segments in the segment array, said lookup table comprising a plurality of pairs, each of said pairs comprising a key value and a segment array location, said key value being used to index into the lookup table to obtain a corresponding segment array location, wherein the segments are stored in the segment array in an indexed order and according to a collating sequence of the key values in the lookup table.

2. The method of claim 1, wherein said segments in the segment array are directly accessible by first accessing a root segment and then accessing child segments of the root segment using the lookup table.

3. The method of claim 1, wherein said storing comprises storing the segments in the segment array according to rules in the IMS database.

4. The method of claim 1, wherein said key value comprises a segment type identification number, a partition identification number, a data set group identification number, and a relative byte address.

5. The method of claim 4, wherein said segment type identification number within said key value causes root segments to be stored in the segment array before child segments.

6. A method for accessing an Information Management System (IMS) database, the method comprising:
 reading blocks of the IMS database sequentially, block by block, wherein each of the blocks comprises zero or more segments;
 de-blocking segments in said blocks in response to said reading;
 storing each segment in a segment array in response to said de-blocking, said segments in the segment array being directly accessible, the segment array being usable to unload the segments, the segments being stored in the segment array in an indexed order,
 creating a lookup table, said lookup table being useable to access the segments in the segment array; and
 accessing segments from the segment array, wherein said accessing comprises:
  (a) examining a root segment in the segment array;
  (b) generating a key for a first child segment of the root segment using information in the root segment;
  (c) obtaining a segment memory location of the first child segment from the lookup table using the key for the first child segment;
  (d) examining the first child segment using the segment memory location of the first child segment;
  (e) generating a key for a subsequent child segment of the root segment using information in the previous child segment;
  (f) obtaining a segment memory location of the subsequent child segment from the lookup table using the key for the subsequent child segment;
  (g) examining the subsequent child segment using the segment memory location of the subsequent child segment; and
  repeating (e), (f), and (g) for zero or more subsequent child segments.

7. The method of claim 1, further comprising accessing segments from the segment array, wherein said accessing comprises:
 examining a root segment in the segment array; and
 processing information from the root segment and subsequent child segments to access each root segment and its zero or more child segments according to their hierarchical relationship.

8. The method of claim 7, wherein said processing uses the lookup table.

9. A method for accessing an Information Management System (IMS) database, the method comprising:
 reading blocks of the IMS database sequentially, block by block, wherein each of the blocks comprises zero or more segments;
 de-blocking segments in said blocks in response to said reading;
 storing each segment in a segment array in response to said de-blocking, said segments in the segment array being directly accessible, the segment array being usable to unload the segments, wherein said storing comprises storing child segments in the segment array in a relative byte address (RBA) order; and
 creating a first segment array for root segments and a second segment array for child segments.

10. The method of claim 9, wherein said segments in the segment arrays are directly accessible by first accessing a root segment from the first segment array and then accessing child segments of the root segment from the second segment array.

11. The method of claim 9, further comprising accessing segments from the segment arrays, wherein said accessing comprises:
 (a) examining a root segment in the first segment array;
 (b) determining an RBA of a first child segment of the root segment using information in the root segment;
 (c) examining the first child segment in the second segment array using the RBA of the first child segment;
 (d) determining an RBA of a subsequent child segment of the root segment using information in the previous child segment;
 (e) examining the subsequent child segment in the second segment array using the RBA of the subsequent child segment; and
 repeating (d) and (e) for zero or more subsequent child segments.

12. The method of claim 9, further comprising accessing segments from the segment array, wherein said accessing comprises:
 examining a root segment in the segment array; and
 processing information from the root segment and subsequent child segments to access each root segment and its zero or more child segments according to their hierarchical relationship.

13. The method of claim 12, wherein said processing uses the first segment array and the second segment array.

14. The method of claim 1, wherein de-blocking segments in said blocks in response to said reading further comprises:
 extracting the individual IMS segments that are physically contained within the physical block.

15. A system comprising:
 a network;
 a CPU coupled to the network;
 a memory coupled to the CPU which stores an IMS database;
 a system memory coupled to the CPU, wherein the system memory stores one or more computer programs executable by the CPU;
 wherein the computer programs are executable to:
  read blocks of the IMS database sequentially, block by block, wherein each of the blocks comprises zero or more segments;
  de-block segments in said blocks in response to said reading;
  store each segment in a segment array in response to said de-blocking, said segments in the segment array being directly accessible, the segment array being usable to unload the segments; and
  create a lookup table, said lookup table being useable to access the segments in the segment array, said lookup table comprising a plurality of pairs, each of said pairs comprising a key value and a segment array location, said key value being used to index into the lookup table to obtain a corresponding segment array location, wherein the segments are stored in the segment array in an indexed order and according to a collating sequence of the key values in the lookup table.

16. The system of claim 15, wherein said segments in the segment array are directly accessible by first accessing a root segment and then accessing child segments of the root segment using the lookup table.

17. The system of claim 15, wherein said storing comprises storing the segments in the segment array according to rules in the IMS database.

18. The system of claim 15, wherein said key value comprises a segment type identification number, a partition identification number, a data set group identification number, and a relative byte address.

19. The system of claim 18, wherein said segment type identification number within said key value causes the root segments to be stored in the segment array before the child segments.

20. A system comprising:
a network;
a CPU coupled to the network;
a memory coupled to the CPU which stores an IMS database;
a system memory coupled to the CPU, wherein the system memory stores one or more computer programs executable by the CPU;
wherein the computer programs are executable to:
read blocks of the IMS database sequentially, block by block, wherein each of the blocks comprises zero or more segments;
de-block segments in said blocks in response to said reading;
store each segment in a segment array in response to said de-blocking, said segments in the segment array being directly accessible, the segment array being usable to unload the segments, the segments in the segment array being stored in an indexed order;
create a lookup table, said lookup table being useable to access the segments in the segment array; and
access segments from the segment array, wherein said accessing comprises:
(a) examining a root segment in the segment array;
(b) generating a key for a first child segment of the root segment using information in the root segment;
(c) obtaining a segment memory location of the first child segment from the lookup table using the key for the first child segment;
(d) examining the first child segment using the segment memory location of the first child segment;
(e) generating a key for a subsequent child segment of the root segment using information in the previous child segment;
(f) obtaining a segment memory location of the subsequent child segment from the lookup table using the key for the subsequent child segment;
(g) examining the subsequent child segment using the segment memory location of the subsequent child segment; and
repeating (e), (f), and (g) for zero or more subsequent child segments.

21. The system of claim 15, wherein the computer programs are further executable to access segments from the segment array, wherein said accessing comprises:
examining a root segment in the segment array; and
processing information from the root segment and subsequent child segments to access each root segment and its zero or more child segments according to their hierarchical relationship.

22. The system of claim 21, wherein said processing uses the lookup table.

23. A system comprising:
a network;
a CPU coupled to the network;
a memory coupled to the CPU which stores an IMS database;
a system memory coupled to the CPU, wherein the system memory stores one or more computer programs executable by the CPU;
wherein the computer programs are executable to:
read blocks of the IMS database sequentially, block by block, wherein each of the blocks comprises zero or more segments;
de-block segments in said blocks in response to said reading;
store each segment in a segment array in response to said de-blocking, said segments in the segment array being directly accessible, the segment array being usable to unload the segments, wherein said storing comprises storing child segments in the segment array in a relative byte address (RBA) order; and
create a first segment array for root segments and a second segment array for child segments.

24. The system of claim 23, wherein said segments in the segment arrays are directly accessible by first accessing a root segment from the first segment array and then accessing child segments of the root segment from the second segment array.

25. The system of claim 23, wherein the computer programs are further executable to access segments from the segment arrays, wherein said accessing comprises:
(a) examining a root segment in the first segment array;
(b) determining an RBA of a first child segment of the root segment using information in the root segment;
(c) examining the first child segment in the second segment array using the RBA of the first child segment;
(d) determining an RBA of a subsequent child segment of the root segment using information in the previous child segment;
(e) examining the subsequent child segment in the second segment array using the RBA of the subsequent child segment; and
repeating (d) and (e) for zero or more subsequent child segments.

26. The system of claim 23, wherein the computer programs are further executable to access segments from the segment array, wherein said accessing comprises:
examining a root segment in the segment array; and
processing information from the root segment and subsequent child segments to access each root segment and its zero or more child segments according to their hierarchical relationship.

27. The system of claim 26, wherein said processing uses the first segment array and the second segment array.

28. The system of claim 15, wherein the computer programs are further executable to de-block segments in said blocks in response to said reading by extracting the individual IMS segments that are physically contained within the physical block.

29. A program storage medium readable by a programmable device and storing program instructions thereon, wherein the program instructions are executable to implement:
  reading blocks of the IMS database sequentially, block by block, wherein each of the blocks comprises zero or more segments;
  de-blocking segments in said blocks in response to said reading;
  storing each segment in a segment array in response to said de-blocking, said segments in the segment array being directly accessible, the segment array being usable to unload the segments; and
  creating a lookup table, said lookup table being useable to access the segments in the segment array, said lookup table comprising a plurality of pairs, each of said pairs comprising a key value and a segment array location, said key value being used to index into the lookup table to obtain a corresponding segment array location,
  wherein the segments in the segment array are stored in an indexed order and are stored according to a collating sequence of the key values in the lookup table.

30. The program storage medium of claim 29, wherein said segments in the segment array are directly accessible by first accessing a root segment and then accessing child segments of the root segment using the lookup table.

31. The program storage medium of claim 29, wherein said storing comprises storing the segments in the segment array according to rules in the IMS database.

32. The program storage medium of claim 31, wherein said key value comprises a segment type identification number, a partition identification number, a data set group identification number, and a relative byte address.

33. The program storage medium of claim 32, wherein said segment type identification number within said key value causes the root segments to be stored in the segment array before the child segments.

34. A program storage medium readable by a programmable device and storing program instructions thereon, wherein the program instructions are executable to implement:
  reading blocks of the IMS database sequentially, block by block, wherein each of the blocks comprises zero or more segments;
  de-blocking segments in said blocks in response to said reading;
  storing each segment in a segment array in response to said de-blocking, said segments in the segment array being directly accessible, the segment array being usable to unload the segments, the segments being stored in the segment array in an indexed order;
  creating a lookup table, said lookup table being useable to access the segments in the segment array; and
  accessing segments from the segment array, wherein said accessing comprises:
    (a) examining a root segment in the segment array;
    (b) generating a key for a first child segment of the root segment using information in the root segment;
    (c) obtaining a segment memory location of the first child segment from the lookup table using the key for the first child segment;
    (d) examining the first child segment using the segment memory location of the first child segment;
    (e) generating a key for a subsequent child segment of the root segment using information in the previous child segment;
    (f) obtaining a segment memory location of the subsequent child segment from the lookup table using the key for the subsequent child segment;
    (g) examining the subsequent child segment using the segment memory location of the subsequent child segment; and
    repeating (e), (f), and (g) for zero or more subsequent child segments.

35. The program storage medium of claim 29, wherein the program instructions are further executable to implement accessing segments from the segment array, wherein said accessing comprises:
  examining a root segment in the segment array; and
  processing information from the root segment and subsequent child segments to access each root segment and its zero or more child segments according to their hierarchical relationship.

36. The program storage medium of claim 35, wherein said processing uses the lookup table.

37. A program storage medium readable by a programmable device and storing program instructions thereon, wherein the program instructions are executable to implement:
  reading blocks of the IMS database sequentially, block by block, wherein each of the blocks comprises zero or more segments;
  de-blocking segments in said blocks in response to said reading;
  storing each segment in a segment array in response to said de-blocking, said segments in the segment array being directly accessible, the segment array being usable to unload the segments, wherein said storing comprises storing child segments in the segment array in a relative byte address (RBA) order; and
  creating a first segment array for root segments and a second segment array for child segments.

38. The program storage medium of claim 37, wherein said segments in the segment arrays are directly accessible by first accessing a root segment from the first segment array and then accessing child segments of the root segment from the second segment array.

39. The program storage medium of claim 37, wherein the program instructions are further executable to implement accessing segments from the segment arrays, wherein said accessing comprises:
  (a) examining a root segment in the first segment array;
  (b) determining an RBA of a first child segment of the root segment using information in the root segment;
  (c) examining the first child segment in the second segment array using the RBA of the first child segment;
  (d) determining an RBA of a subsequent child segment of the root segment using information in the previous child segment;
  (e) examining the subsequent child segment in the second segment array using the RBA of the subsequent child segment; and
  repeating (d) and (e) for zero or more subsequent child segments.

40. The program storage medium of claim 37, wherein the program instructions are further executable to implement accessing segments from the segment array, wherein said accessing comprises:
  examining a root segment in the segment array; and
  processing information from the root segment and subsequent child segments to access each root segment and its zero or more child segments according to their hierarchical relationship.

41. The program storage medium of claim 40, wherein said processing uses the first segment array and the second segment array.

42. The program storage medium of claim 29, wherein the program instructions are further executable to implement deblocking segments in said blocks in response to said reading by extracting the individual IMS segments that are physically contained within the physical block.

* * * * *